United States Patent
Zhang et al.

(10) Patent No.: US 12,499,373 B2
(45) Date of Patent: Dec. 16, 2025

(54) METHOD, SYSTEM, AND APPARATUS FOR CREATING KNOWLEDGE GRAPH IN INDUSTRIAL FIELD

(71) Applicant: Siemens Aktiengesellschaft, Munich (DE)

(72) Inventors: Bin Zhang, Beijing (CN); Armin Roux, Höchstadt a. d. Aisch (DE); Shun Jie Fan, Beijing (CN); Zhi Min Chen, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/114,491

(22) PCT Filed: Sep. 27, 2022

(86) PCT No.: PCT/CN2022/121782
§ 371 (c)(1),
(2) Date: Mar. 24, 2025

(87) PCT Pub. No.: WO2024/065190
PCT Pub. Date: Apr. 4, 2024

(65) Prior Publication Data
US 2025/0265479 A1     Aug. 21, 2025

(51) Int. Cl.
*G06N 5/022* (2023.01)
(52) U.S. Cl.
CPC ................... *G06N 5/022* (2013.01)
(58) Field of Classification Search
CPC .................................. G06N 5/022
See application file for complete search history.

(56) References Cited

U.S. PATENT DOCUMENTS 11,568,304 B1\* 1/2023 Atta ................. G06Q 10/20
2020/0218745 A1\* 7/2020 Filoti ................. G06F 16/3329
(Continued)

FOREIGN PATENT DOCUMENTS

CN    113177124 A    7/2021
CN    114186690 A    3/2022
(Continued)

OTHER PUBLICATIONS

Search Report for International Application No. PCT/CN2022/121752, 7 pp. May 31, 2023.

*Primary Examiner* — Etienne P Leroux
(74) *Attorney, Agent, or Firm* — Slayden Grubert Beard PLLC

(57) ABSTRACT

Various embodiments of the teachings herein include a method for creating a knowledge graph in the industrial field. An example includes: obtaining unstructured data from a first source in a sub-field of the industrial field, with knowledge annotations; performing machine learning on the unstructured data to generate a first model adapted to extract knowledge; extracting knowledge from second unstructured data provided by the first source based on the first model, without knowledge annotations; obtaining first structured data and first semi-structured data from a second source in a second sub-field; extracting second knowledge from the first structured data; extracting third knowledge from the first semi-structured data; and building a knowledge graph integrating the first and second sub-field based on the first, second, and third knowledge, represented in the form of triples.

12 Claims, 5 Drawing Sheets

(56) References Cited

U.S. PATENT DOCUMENTS

2021/0286832 A1    9/2021   Prasad Tanniru
2025/0029388 A1*   1/2025   Semmens ............... G06T 7/292

FOREIGN PATENT DOCUMENTS

| CN | 114254129 A | 3/2022 |
| CN | 114297410 A | 4/2022 |

* cited by examiner

METHOD, SYSTEM, AND APPARATUS FOR CREATING KNOWLEDGE GRAPH IN INDUSTRIAL FIELD

CROSS-REFERENCE TO RELATED APPLICATIONS

This application is a U.S. National Stage Application of International Application No. PCT/CN2022/121782 filed Sep. 27, 2022, which designates the United States of America, the contents of which are hereby incorporated by reference in their entirety.

TECHNICAL FIELD

The present disclosure relates to knowledge graphs. Various embodiments of the teachings herein include methods, apparatus, electronic devices, and media for creating a knowledge graph in the industrial field.

BACKGROUND

A Knowledge Graph describes concepts, entities, and their relationships in the objective world in a structured form. It is an interdisciplinary subject that integrates cognitive computing, knowledge representation and reasoning, information retrieval and extraction, natural language processing, Web technology, machine learning and big data mining.

In recent years, the industrial field has begun to favor the knowledge graph as a graphical display method to realize applications such as industrial equipment collection, knowledge classification, knowledge storage and knowledge analysis. The introduction of knowledge graph into the industrial field solves the problem of knowledge construction in the industrial field. However, information in the industrial field is messier and more disordered than other fields, and a lot of information comes from unstructured texts. Therefore, it is important to perform semantic analysis on this information, extract knowledge units that can be used to draw knowledge graphs and find out the connections between knowledge units. However, building knowledge graph is a lot of work.

SUMMARY

Embodiments of the teachings of the present disclosure include methods, apparatus, electronic devices, and media for creating a knowledge graph in the industrial field. For example, some embodiments of the teachings herein include a method for creating a knowledge graph in the industrial field comprising: obtaining (101) first unstructured data from a first data source in a first sub-field of the industrial field, wherein the first unstructured data carries knowledge annotations; performing (102) machine learning on the first unstructured data to generate a first model adapted to extract knowledge; extracting (103) first knowledge from second unstructured data provided by the first data source based on the first model, wherein the second unstructured data does not carry knowledge annotations; obtaining (104) first structured data and first semi-structured data from a second data source in a second sub-field of the industrial field; extracting (105) second knowledge from the first structured data; extracting (106) third knowledge from the first semi-structured data; and building (107) a knowledge graph integrating the first sub-field and the second sub-field based on the first knowledge, the second knowledge and the third knowledge, wherein the first knowledge, the second knowledge and the third knowledge are all represented in the form of triples.

In some embodiments, the proportion of unstructured data in the first sub-field is greater than a predetermined threshold, and the proportion of unstructured data in the second sub-field is less than the threshold.

In some embodiments, the first sub-field and the second sub-field belong to the same industrial category.

In some embodiments, the first sub-field and the second sub-field belong to the same industrial sub-category.

In some embodiments, the method further comprises: obtaining second structured data and second semi-structured data from the first data source; extracting fourth knowledge from the second structured data; extracting fifth knowledge from the second semi-structured data; wherein the building (107) knowledge graph integrating the first sub-field and the second sub-field based on the first knowledge, the second knowledge and the third knowledge comprising: building the knowledge graph based on the first knowledge, the second knowledge, the third knowledge, the fourth knowledge and the fifth knowledge.

In some embodiments, building knowledge graph integrating the first sub-field and the second sub-field comprising: building a knowledge graph of the first sub-field based on the first knowledge, the fourth knowledge and the fifth knowledge; building a knowledge graph of the second sub-field based on the second knowledge and the third knowledge; combining the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph the second of sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

As another example, some embodiments include an apparatus for creating a knowledge graph in the industrial field, comprising: a first obtaining module (401), configured to obtain first unstructured data from a first data source in a first sub-field of the industrial field, wherein the first unstructured data carries knowledge annotations; a performing module (402), configured to perform machine learning on the first unstructured data to generate a first model adapted to extract knowledge; a first extracting module (403), configured to extract first knowledge from second unstructured data provided by the first data source based on the first model, wherein the second unstructured data does not carry knowledge annotations; a second obtaining module (404), configured to obtain first structured data and first semi-structured data from a second data source in a second sub-field of the industrial field; a second extracting module (405), configured to extract second knowledge from the first structured data; a third extracting module (406), configured to extract third knowledge from the first semi-structured data; and a building module (407), configured to build a knowledge graph integrating the first sub-field and the second sub-field based on the first knowledge, the second knowledge and the third knowledge, wherein the first knowledge, the second knowledge and the third knowledge are all represented in the form of triples.

In some embodiments, the proportion of unstructured data in the first sub-field is greater than a predetermined threshold, and the proportion of unstructured data in the second sub-field is less than the threshold.

In some embodiments, the first sub-field and the second sub-field belong to the same industrial category.

In some embodiments, the first sub-field and the second sub-field belong to the same industrial sub-category.

In some embodiments, the first obtaining module (401) is configured to obtain second structured data and second semi-structured data from the first data source; the first extracting module (403) is configured to extract fourth knowledge from the second structured data and the fifth knowledge from the second semi-structured data; the building module (407) is configured to build the knowledge graph based on the first knowledge, the second knowledge, the third knowledge, the fourth knowledge and the fifth knowledge.

In some embodiments, the building module (407) is configured to build a knowledge graph of the first sub-field based on the first knowledge, the fourth knowledge and the fifth knowledge; build a knowledge graph of the second sub-field based on the second knowledge and the third knowledge; combine the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph of the second sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

As another example, some embodiments include an electronic device comprising a processor (501) and a memory (502), wherein an application program executable by the processor (501) is stored in the memory (502) for causing the processor (501) to execute one or more of the methods for creating a knowledge graph in the industrial field as described herein.

As another example, some embodiments include a computer-readable medium comprising computer-readable instructions stored thereon, wherein the computer-readable instructions direct one or more processors to execute a method for creating a knowledge graph in the industrial field as described herein.

As another example, some embodiments include a computer program product comprising a computer program, upon the computer program is executed by a processor for executing one or more of the methods for creating a knowledge graph in the industrial field as described herein.

BRIEF DESCRIPTION OF THE DRAWINGS

In order to make technical solutions of examples of the present disclosure clearer, accompanying drawings to be used in description of the examples will be simply introduced hereinafter. Obviously, the accompanying drawings to be described hereinafter are only some examples of the present disclosure. Those skilled in the art may obtain other drawings according to these accompanying drawings without creative labor. In the figures.

Figure 1:
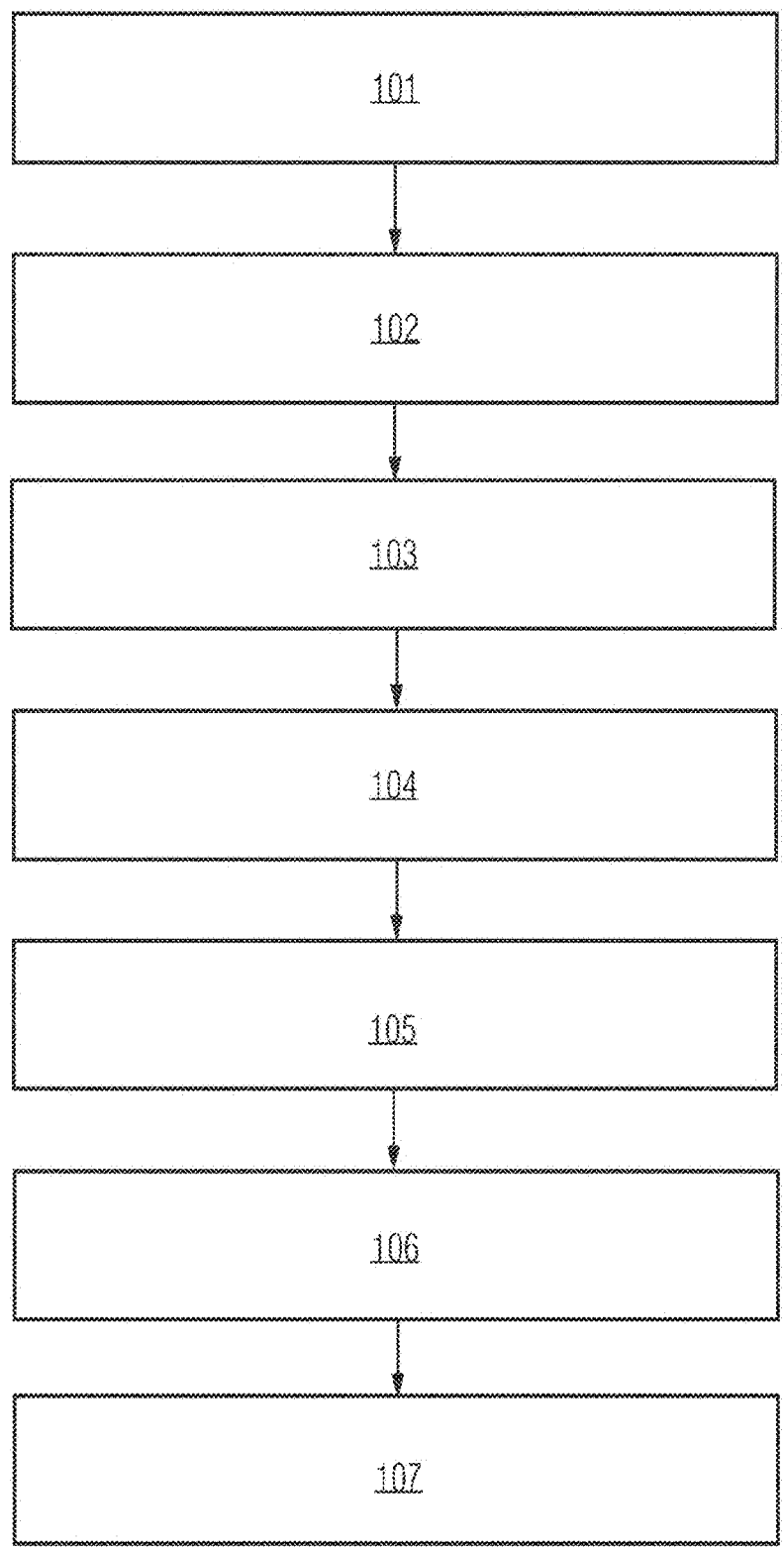
FIG. 1 is a flowchart of an example method for creating knowledge graph in the industrial field incorporating teachings of the present disclosure.

LIST OF REFERENCE NUMBERS reference numbers meanings
101~107 steps
11 first data source
12 second data source
21 unstructured data
22 structured data
23 semi-structured data
24 structured data
25 semi-structured data
26 knowledge extraction model
31 first knowledge
32 fourth knowledge
33 fifth knowledge
34 second knowledge
35 third knowledge
36 first knowledge graph
37 second knowledge graph g
38 third knowledge graph
40 data source
41 data parsing process
42 unstructured data
43 knowledge extraction model
44 knowledge represented by triples
45 Neo4 database
50 structured data
51 knowledge extracted from structured data
52 manual knowledge addition
53 knowledge represented by triples
54 aggregated knowledge
400 apparatus for creating a knowledge graph
401 first obtaining module
402 performing module
403 first extracting module
404 second obtaining module
405 second extracting module
406 third extracting module
407 building module
500 electronic device
501 processor
502 memory

DETAILED DESCRIPTION

Some embodiments of the teachings herein include a method for creating a knowledge graph in the industrial field comprising: obtaining first unstructured data from a first data source in a first sub-field of the industrial field, wherein the first unstructured data carries knowledge annotations; performing machine learning on the first unstructured data to generate a first model adapted to extract knowledge; extracting first knowledge from second unstructured data provided by the first data source based on the first model, wherein the second unstructured data does not carry knowledge annotations; obtaining first structured data and first semi-structured data from a second data source in a second sub-field of the industrial field; extracting second knowledge from the first structured data; extracting third knowledge from the first semi-structured data; and building a knowledge graph integrating the first sub-field and the second sub-field based on the first knowledge, the second knowledge and the third knowledge, wherein the first knowledge, the second knowledge and the third knowledge are all represented in the form of triples. Therefore, a knowledge graph that integrates multiple sub-fields can be constructed.

In some embodiments, wherein the proportion of unstructured data in the first sub-field is greater than a predetermined threshold, and the proportion of unstructured data in the second sub-field is less than the threshold. Therefore, for sub-fields with a large proportion of unstructured data, knowledge is extracted from unstructured data, and for sub-fields with a small proportion of unstructured data, knowledge is extracted from structured data or semi-structured data. Therefore, the knowledge graph obtained by integration achieves a good compromise between the breadth of the field, the comprehensiveness of the data and the difficulty of implementation.

In some embodiments, the first sub-field and the second sub-field belong to the same industrial category. Therefore, for sub-fields that are close to each other, a good compromise can be achieved through this differentiated knowledge extraction strategy.

In some embodiments, the first sub-field and the second sub-field belong to the same industrial sub-category. Therefore, for sub-fields that are particularly close to each other, a better compromise can be achieved through this differentiated knowledge extraction strategy.

In some embodiments, the method further comprises: obtaining second structured data and second semi-structured data from the first data source; extracting fourth knowledge from the second structured data; extracting fifth knowledge from the second semi-structured data; wherein the building knowledge graph integrating the first sub-field and the second sub-field based on the first knowledge, the second knowledge and the third knowledge comprising: building the knowledge graph based on the first knowledge, the second knowledge, the third knowledge, the fourth knowledge and the fifth knowledge. Therefore, the knowledge graph can be further enriched.

In some embodiments, the building knowledge graph integrating the first sub-field and the second sub-field comprises: building a knowledge graph of the first sub-field based on the first knowledge, the fourth knowledge and the fifth knowledge; building a knowledge graph of the second sub-field based on the second knowledge and the third knowledge; combining the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph the second of sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

Therefore, by combining entities with high similarity, the accuracy of knowledge graph is improved.

Some embodiments include an apparatus for creating a knowledge graph in the industrial field is provided, the apparatus comprising: a first obtaining module, configured to obtain first unstructured data from a first data source in a first sub-field of the industrial field, wherein the first unstructured data carries knowledge annotations; a performing module, configured to perform machine learning on the first unstructured data to generate a first model adapted to extract knowledge; a first extracting module, configured to extract first knowledge from second unstructured data provided by the first data source based on the first model, wherein the second unstructured data does not carry knowledge annotations; a second obtaining module, configured to obtain first structured data and first semi-structured data from a second data source in a second sub-field of the industrial field; a second extracting module, configured to extract second knowledge from the first structured data; a third extracting module, configured to extract third knowledge from the first semi-structured data; and a building module, configured to build a knowledge graph integrating the first sub-field and the second sub-field based on the first knowledge, the second knowledge and the third knowledge, wherein the first knowledge, the second knowledge and the third knowledge are all represented in the form of triples. Therefore, a knowledge graph that integrates multiple sub-fields can be constructed.

In some embodiments, the proportion of unstructured data in the first sub-field is greater than a predetermined threshold, and the proportion of unstructured data in the second sub-field is less than the threshold. Therefore, for sub-fields with a large proportion of unstructured data, knowledge is extracted from unstructured data, and for sub-fields with a small proportion of unstructured data, knowledge is extracted from structured data or semi-structured data. Therefore, the knowledge graph obtained by integration achieves a good compromise between the breadth of the field, the comprehensiveness of the data and the difficulty of implementation.

In some embodiments, the first sub-field and the second sub-field belong to the same industrial category. Therefore, for sub-fields that are close to each other, a good compromise can be achieved through this differentiated knowledge extraction strategy.

In some embodiments, the first sub-field and the second sub-field belong to the same industrial sub-category. Therefore, for sub-fields that are particularly close to each other, a better compromise can be achieved through this differentiated knowledge extraction strategy.

In some embodiments, the first obtaining module is configured to obtain second structured data and second semi-structured data from the first data source; the first extracting module is configured to extract fourth knowledge from the second structured data and the fifth knowledge from the second semi-structured data; the building module is configured to build the knowledge graph based on the first knowledge, the second knowledge, the third knowledge, the fourth knowledge and the fifth knowledge. Therefore, the knowledge graph can be further enriched In some embodiments, the building module is configured to build a knowledge graph of the first sub-field based on the first knowledge, the fourth knowledge and the fifth knowledge; build a knowledge graph of the second sub-field based on the second knowledge and the third knowledge; combine the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph the second of sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold Therefore, by combining entities with high similarity, the accuracy of knowledge graph is improved.

In some embodiments, an electronic device comprises a processor and a memory, wherein an application program executable by the processor is stored in the memory for causing the processor to execute one or more methods for creating a knowledge graph in the industrial field as described herein.

In some embodiments, a computer-readable medium stores computer-readable instructions, wherein the computer-readable instructions for executing one or more of the methods for creating a knowledge graph in the industrial field described herein.

In some embodiments, a computer program product includes a computer program, When the computer program is executed by a processor for executing one or more of the methods for creating a knowledge graph in the industrial field described herein.

In order to make the purpose, technical scheme, and advantages of the teachings of the present disclosure more clear, the following examples are given to further explain the invention in detail. In order to be concise and intuitive in description, the scheme is described below by describing several representative embodiments. Many details in the embodiments are only used to help understand the scheme. However, it is obvious that the technical scheme can be realized without being limited to these details. In order to avoid unnecessarily blurring the scheme, some embodiments are not described in detail, but only the framework is given. Hereinafter, "including" refers to "including but not limited to", "according to . . . " refers to "at least according to . . . , but not limited to . . . ". Due to the language habits of Chinese, when the number of an element is not specifically indicated below, it means that the element can be one or more or can be understood as at least one.

With the rapid development of digitization, unstructured data plays an increasingly important role. However, knowledge extraction based on unstructured data is difficult. For industrial fields with a wide variety of industries, it is of great significance to realize a knowledge graph construction scheme that achieves a compromise between the breadth of the field, the comprehensiveness of the data, and the difficulty of implementation.

FIG. 1 is a flowchart of an method for creating a knowledge graph in an industrial field incorporating teachings of the present disclosure. As shown in FIG. 1, the method comprises:

Step 101: obtaining first unstructured data from a first data source in a first sub-field of the industrial field, wherein the first unstructured data carries knowledge annotations. The industrial field can be divided into multiple sub-fields according to different division methods. For example, industry can be divided into the following sub-fields: metallurgical industry, electric power industry, coal and coking industry, petroleum industry, chemical industry, machinery industry, building materials industry, forest industry, food industry, textile industry, sewing industry, Tanning industry and other industries.

For example, by product nature, the industrial field can be divided into the following sub-fields: light industry and heavy industry. For example, according to the relative intensity of three production factors of labor, capital and technology in each industry, the industrial field can be divided into the following sub-fields: labor-intensive, capital-intensive, and technology-intensive industries. For example, according to the general industrial industry classification catalogue in the industry, the industrial field can be divided into 39 industrial categories, 191 medium categories, and 525 subcategories. Any category, medium category, subcategory or their combination can constitute a sub-field. Moreover, those skilled in the art can further divide the sub-fields according to actual needs, which are not limited by the embodiments described herein.

The first unstructured data obtained from the first data source in first sub-field may specifically be text data such as operation specification descriptions. The first unstructured data has knowledge annotations. The knowledge annotation may comprise at least one of entity annotation, entity relationship annotation and entity attribute annotation. Based on the first unstructured data with knowledge annotations, an artificial intelligence model is trained through machine learning, and the trained artificial intelligence model is adapted to extract knowledge from unstructured data.

The unstructured data may be obtained by web crawling, for example, the unstructured data may be obtained by crawling according to a keyword, and the unstructured data may be manually marked to obtain the first unstructured data.

Step 102: performing machine learning on the first unstructured data to generate a first model adapted to extract knowledge. Here, using the first unstructured data, a machine learning algorithm is used to train an artificial neural network model into the first model.

Step 103: extracting first knowledge from second unstructured data provided by the first data source based on the first model, wherein the second unstructured data does not carry knowledge annotations.

Step 104: obtaining first structured data and first semi-structured data from a second data source in a second sub-field of the industrial field. Here, unstructured data in the second sub-field field may not be obtained.

Step 105: extracting second knowledge from the first structured data.

Step 106: extracting third knowledge from the first semi-structured data. For example, the third knowledge can be extracted from the first semi-structured data through regular expressions.

Step 107: building a knowledge graph integrating the first sub-field and the second sub-field based on the first knowledge, the second knowledge and the third knowledge, wherein the first knowledge, the second knowledge and the third knowledge are all represented in the form of triples. For example, triples may include: (entity-entity relationship-entity) or (entity-attribute-attribute value).

The ontology library in the industrial field can be pre-built, or the built ontology library based on the existing mechanism can be obtained. Wherein, the ontology library comprises an ontology constructed according to the knowledge system of the first sub-field and an ontology constructed according to the knowledge system of the second sub-field. The knowledge system is regulation of knowledge naming and knowledge classification, wherein the knowledge annotations in the first unstructured data match the ontology library.

In some embodiments, the process of building knowledge graph according to first knowledge, second knowledge and third knowledge may comprising: establishing entity nodes corresponding to the entities in the first knowledge, the second knowledge and the third knowledge; establishing connection relationships between the entity nodes according to entity relationships in the first knowledge, the second knowledge and the third knowledge; setting attributes and attribute values of entity nodes according to the attributes and attribute values in the first knowledge, the second knowledge and the third knowledge. Since the knowledge annotations of the first unstructured data carry a large amount of trusted knowledge, the knowledge annotations can be added to the knowledge graph at the same time.

The knowledge graph generated in step 107 comprising both the knowledge of the first sub-field and the second sub-field. There is no need to perform unstructured knowledge extraction processing on the second sub-field that requires a large amount of computation. A good compromise between data comprehensiveness and implementation difficulty.

In some embodiments, the proportion of unstructured data in the first sub-field is greater than a predetermined threshold, and the proportion of unstructured data in the second sub-field is less than the threshold. For example, the threshold is 80%. For example, the ratio of the unstructured data volume in the first data source to the total data volume in the first data source is used as the judgment basis. When the ratio exceeds 80%, it is determined that the proportion of unstructured data in the first sub-field is greater than the threshold. Similarly, the ratio of the amount of unstructured data in the second data source to the total amount of data in the second data source is also used as judgment basis. when the ratio is less than 80%, it is determined that the proportion of unstructured data in the second sub-field is less than the threshold.

For the first sub-field where the proportion of unstructured data relative to the total data volume in first sub-field is relatively large, knowledge is extracted from unstructured data by modeling based on machine learning. However, for the second sub-field where the proportion of unstructured data relative to the total data volume of second sub-field is small, there is no need to extract knowledge from unstructured data by modeling, instead directly extracts structured data and unstructured data, thus realizing a knowledge graph creation method with a good compromise between field breadth and implementation difficulty. Moreover, the knowledge graph obtained by combination also has comprehensive data.

In some embodiments, the first sub-field and the second sub-field belong to the same industrial category. Therefore, for two sub-fields in the same industrial category, considering the homogeneity of these two categories, a good compromise can be achieved through this differentiated knowledge extraction method. In some embodiments, the first sub-field and the second sub-field belong to the same industrial sub-category. Therefore, for two sub-fields in the same industrial sub-category, considering the significant homogeneity of these two sub-categories, a better compromise can be achieved through this differentiated knowledge extraction method.

In some embodiments, the method further comprises: obtaining second structured data and second semi-structured data from the first data source; extracting fourth knowledge from the second structured data; extracting fifth knowledge from the second semi-structured data; wherein the building knowledge graph integrating the first sub-field and the second sub-field based on the first knowledge, the second knowledge and the third knowledge comprising: building the knowledge graph based on the first knowledge, the second knowledge, the third knowledge, the fourth knowledge and the fifth knowledge. Therefore, the knowledge graph can be further enriched.

In some embodiments, the building knowledge graph integrating the first sub-field and the second sub-field comprising: building a knowledge graph of the first sub-field based on the first knowledge, the fourth knowledge and the fifth knowledge; building a knowledge graph of the second sub-field based on the second knowledge and the third knowledge; combining the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph of the second sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold. Therefore, by combining entities with high similarity, the accuracy of knowledge graph is improved.

Figure 2:
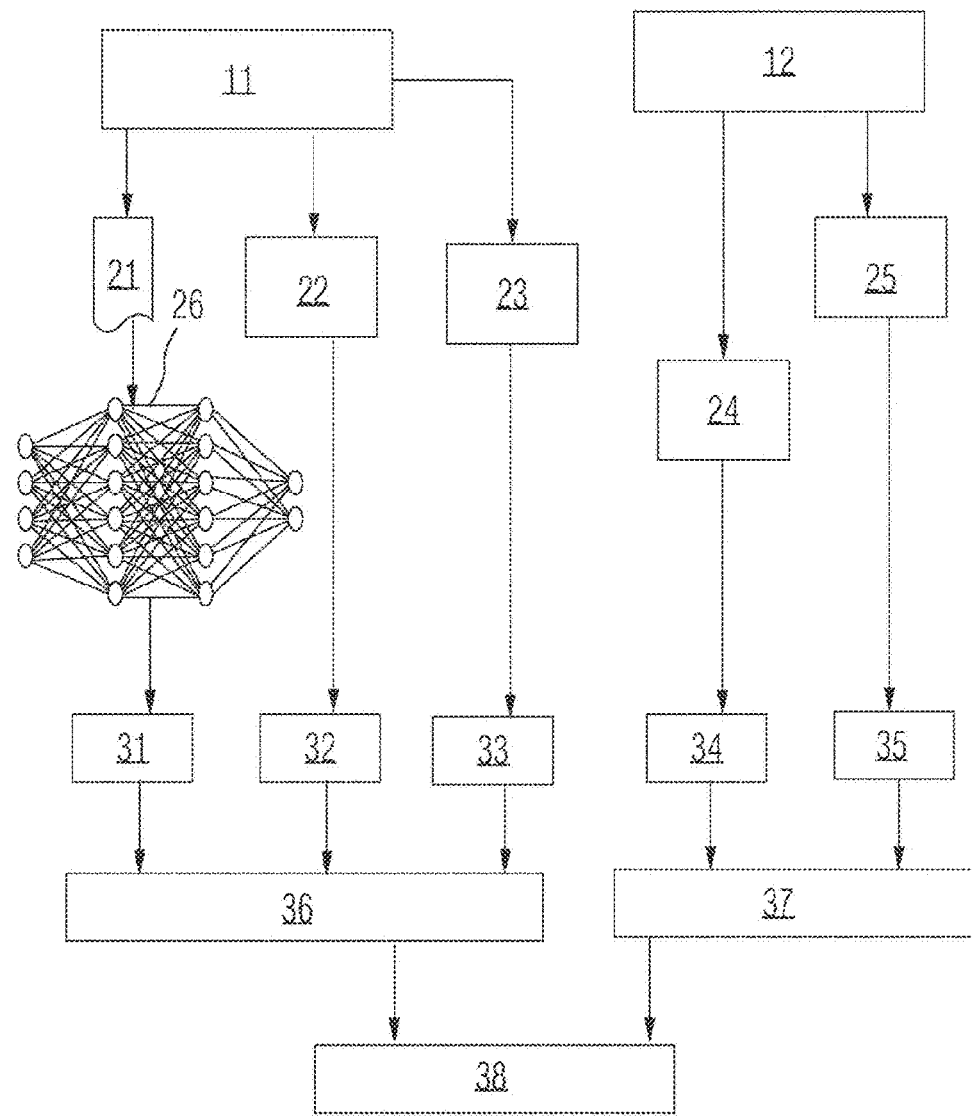
FIG. 2 is a schematic diagram of an example creation process of knowledge graph in an industrial field incorporating teachings of the present disclosure.

FIG. 2 is a schematic diagram of an example creation process of a knowledge graph in an industrial field incorporating teachings of the present disclosure. As shown in FIG. 2, unstructured data 21, structured data 22 and semi-structured data 23 are obtained from first data source 11 in first sub-field of the industrial field. Unstructured data 21, structured data 22 and semi-structured data 23 are all data in the first sub-field. For example, unstructured data 21 may comprise industrial code of practice text. The structured data 23 may be data in a database. The semi-structured data 23 may be partially structured data such as tables and encyclopedia data.

The structured data 24 and semi-structured data 25 are obtained from second data source 12 in second sub-field. Both structured data 24 and semi-structured data 25 are data in the second sub-field. For example, the structured data 24 may specifically be data in a database. The semi-structured data 25 may be partially structured data such as tables, encyclopedia data, and the like.

Part of data is extracted from the unstructured data 21 provided by the first data source 11 as a training set. For example, unstructured data 21 is divided according to the ratio of 1:3, and the part with ratio of 1 is the training set. The part that accounts for 3 is used to extract knowledge. Add knowledge annotations to the data in the training set, and the knowledge annotations are matched with the ontology library containing the respective knowledge systems of the first sub-field and the second sub-field. For example, the ontology is an established ontology library for the whole industry. The knowledge annotation may comprise at least one of entity annotation, entity relationship annotation and entity attribute annotation.

Using the data in the training set, a training process is performed on a machine learning model, resulting in a knowledge extraction model 26. Then, knowledge is extracted from the data other than the training set in the unstructured data 21 using the knowledge extraction model 26. The extracted knowledge may be used as the first knowledge 31, or the extracted knowledge and the knowledge annotations in the training set may be combined into the first knowledge 31.

The fourth knowledge 32 is extracted from the structured data 22 provided by the first data source 11. The fifth knowledge 33 is extracted from the semi-structured data 23 provided by the first data source 11. The second knowledge 34 is extracted from the structured data 24 originating from the second data source 12 and the third knowledge 35 is extracted from the semi-structured data 25 originating from the second data source 12. The first knowledge 31, the second knowledge 32, the third knowledge 33, the fourth knowledge 34 and the fifth knowledge 35 are all represented in the form of triples.

Based on the first knowledge 31, the fourth knowledge 32 and the fifth knowledge 33, a first knowledge graph 36 of the first sub-field is constructed. Based on the second knowledge 34 and the third knowledge 35, a second knowledge graph 37 of the second sub-field is constructed. Wherein, the process of constructing a knowledge graph according to knowledge may comprise: establishing entity nodes corresponding to entities in knowledge; establishing a connection relationship between entity nodes according to entity relationships in knowledge; setting attributes and attribute values of entity nodes according to the attributes and attribute values in the knowledge.

The first knowledge graph 36 and the second knowledge graph 37 are combined to obtain a third knowledge graph 38 suitable for the first sub-field and the second sub-field. It can be understood that an entity has attributes, and if the attributes of two entities are highly similar, it can be determined that the two entities are one entity, so the combination is performed accordingly. In the combination process, for any entity in the first knowledge graph 36: comparing attributes of the entity in the knowledge graph of the first sub-field with respective attributes of an entity in the knowledge graph of the second sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

For example, it is assumed that the first knowledge graph 36 comprises entity A, and the second knowledge graph 36 comprises entity B, entity C, and entity D. Compare the attributes of entity A with the respective attributes of entity B, entity C, and entity D, and find that the similarity between entity A and entity B is greater than a predetermined threshold (for example, 85%), then the entity A and entity B are combined into one entity in the third knowledge graph 38.

Figure 3:
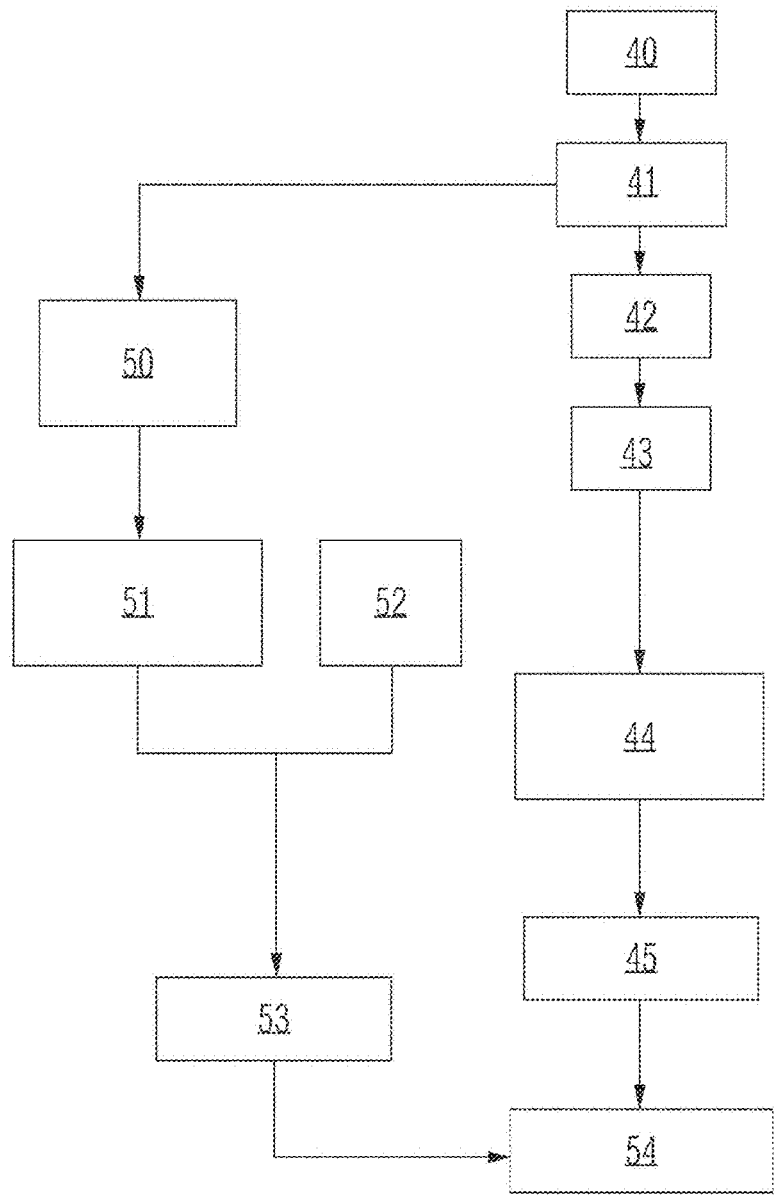
FIG. 3 is a schematic diagram of extracting knowledge incorporating teachings of the present disclosure.

FIG. 3 is a schematic diagram of extracting knowledge incorporating teachings of the present disclosure. In FIG. 3, a data source that provides both unstructured and structured data is used as an example for illustration. In FIG. 3, data is first obtained from data source 40. Then, a data parsing process 41 is performed on the data.

When the parsing result indicates that the data is unstructured data 42, the unstructured data 42 is input into a trained knowledge extraction model 43 to obtain knowledge 44 represented by triples. Knowledge 44 is stored in Neo4j database 45.

When the parsing result indicates that the data is structured data 50, knowledge extraction is performed to extract knowledge 51 from structured data 50. A manual knowledge addition 52 is performed on knowledge 51 to obtain knowledge 53 comprising both knowledge 51 and manual added knowledge represented by triples. Knowledge 44 is retrieved from Neo4j database 45. The knowledge 44 and the knowledge 53 are combined into an aggregated knowledge 54 of the data source 40.

Figure 4:
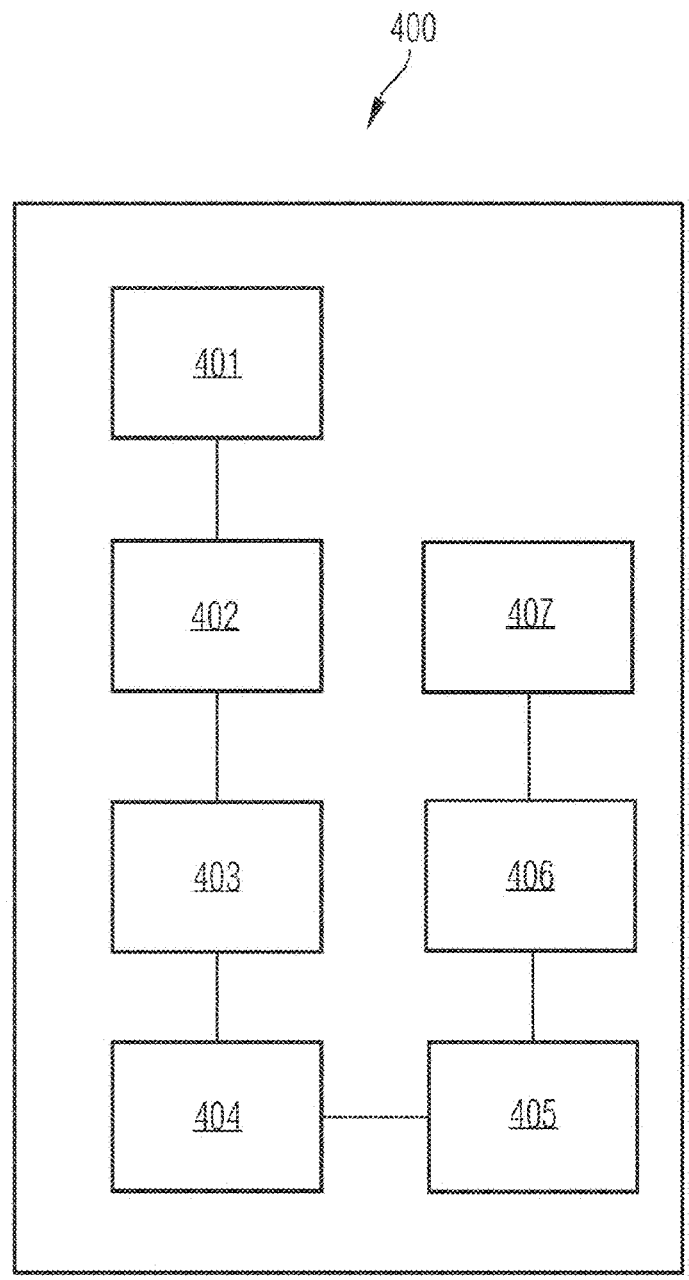
FIG. 4 is a structural diagram of an example apparatus for creating knowledge graph in the industrial field incorporating teachings of the present disclosure.

FIG. 4 is a structural diagram of an example apparatus for creating a knowledge graph in an industrial field incorporating teachings of the present disclosure. The apparatus includes: a first obtaining module 401, configured to obtain first unstructured data from a first data source in a first sub-field of the industrial field, wherein the first unstructured data carries knowledge annotations; a performing module 402, configured to perform machine learning on the first unstructured data to generate a first model adapted to extract knowledge; a first extracting module 403, configured to extract first knowledge from second unstructured data provided by the first data source based on the first model, wherein the second unstructured data does not carry knowledge annotations; a second obtaining module 404, configured to obtain first structured data and first semi-structured data from a second data source in a second sub-field of the industrial field; a second extracting module 405, configured to extract second knowledge from the first structured data; a third extracting module 406, configured to extract third knowledge from the first semi-structured data; and a building module 407, configured to build a knowledge graph integrating the first sub-field and the second sub-field based on the first knowledge, the second knowledge and the third knowledge, wherein the first knowledge, the second knowledge and the third knowledge are all represented in the form of triples.

In some embodiments, the proportion of unstructured data in the first sub-field is greater than a predetermined threshold, and the proportion of unstructured data in the second sub-field is less than the threshold.

In some embodiments, the first sub-field and the second sub-field belong to the same industrial category.

In some embodiments, the first sub-field and the second sub-field belong to the same industrial sub-category.

In some embodiments, the first obtaining module 401 is configured to obtain second structured data and second semi-structured data from the first data source; the first extracting module 403 is configured to extract fourth knowledge from the second structured data and the fifth knowledge from the second semi-structured data; the building module 407 is configured to build the knowledge graph based on the first knowledge, the second knowledge, the third knowledge, the fourth knowledge and the fifth knowledge.

In some embodiments, the building module 407 is configured to build a knowledge graph of the first sub-field based on the first knowledge, the fourth knowledge and the fifth knowledge; build a knowledge graph of the second sub-field based on the second knowledge and the third knowledge; combine the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph of the second sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

Figure 5:
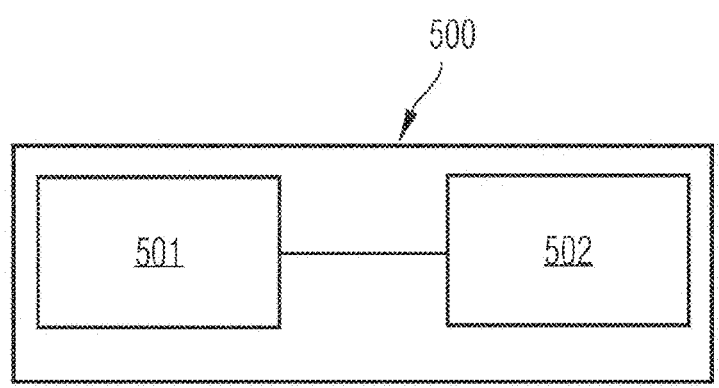
FIG. 5 is a structural diagram of an example electronic device incorporating teachings of the present disclosure.

Some embodiments of the teachings herein include an electronic device with a processor-memory architecture. FIG. 5 is a structural diagram of an example electronic device incorporating teachings of the present disclosure. As shown in FIG. 5, the electronic device 500 comprising a processor 501, a memory 502 and a computer program stored in the memory 502 and executable on the processor 501. When the computer program is executed by the processor 501, any of the above creation method of the knowledge graph is implemented. The memory 502 may specifically be implemented as various storage media such as Electrically Erasable Programmable Read-Only Memory (EEPROM), Flash memory (Flash memory), Programmable Program Read-Only Memory (PROM). The processor 801 may be implemented to comprise one or more central processing units or one or more field programmable gate arrays, wherein the field programmable gate arrays integrate one or more central processing unit cores. In some embodiments, the central processing unit or central processing unit core may be implemented as a CPU or MCU or DSP, and so on.

It should be noted that not all steps and modules in the above-mentioned processes and structural diagrams are necessary, and some steps or modules may be omitted according to actual needs. The execution logic of each step is not fixed and can be adjusted as needed. The division of each module is only to facilitate the description of the functional division used. In actual implementation, a module can be implemented by multiple modules, and the functions of multiple modules can also be implemented by the same module. These modules can be in the same device or in a different device.

The hardware modules in various embodiments may be implemented mechanically or electronically. For example, a hardware module may include specially designed permanent circuits or logic devices (e.g., special-purpose processors, such as FPGAs or ASICs) to perform specific operations. Hardware modules may also include programmable logic devices or circuits temporarily configured by software (e.g., including general-purpose processors or other programmable processors) for performing operations. As for the specific mechanical method, or a dedicated permanent circuit, or a temporarily configured circuit (e.g., configured by software) to realize the hardware module, it can be decided according to cost and time considerations.

The above descriptions are merely preferred embodiments of the present disclosure and are not intended to limit the protection scope thereof. Any modification, equivalent replacement, improvement, etc. made within the spirit and principle shall be included within the protection scope of the present disclosure.

What is claimed is:

1. A method for creating a knowledge graph in the industrial field, the method comprising:
    obtaining first unstructured data from a first data source in a first sub-field of the industrial field, wherein the first unstructured data carries knowledge annotations;
    performing machine learning on the first unstructured data to generate a first model adapted to extract knowledge;
    extracting first knowledge from second unstructured data provided by the first data source based on the first model, wherein the second unstructured data does not carry knowledge annotations;
    obtaining first structured data and first semi-structured data from a second data source in a second sub-field of the industrial field;
    extracting second knowledge from the first structured data;
    extracting third knowledge from the first semi-structured data; and
    building a knowledge graph integrating the first sub-field and the second sub-field based on the first knowledge, the second knowledge and the third knowledge, wherein the first knowledge, the second knowledge, and the third knowledge are all represented in the form of triples.

2. The method according to claim 1, wherein the proportion of unstructured data in the first sub-field is greater than a predetermined threshold, and the proportion of unstructured data in the second sub-field is less than the threshold.

3. The method according to claim 2, wherein the first sub-field and the second sub-field belong to a single industrial category.

4. The method according to claim 3, wherein the first sub-field and the second sub-field belong to a single industrial sub-category.

5. The method according to claim 1, further comprising:
    obtaining second structured data and second semi-structured data from the first data source;
    extracting fourth knowledge from the second structured data; and
    extracting fifth knowledge from the second semi-structured data;
    wherein the building knowledge graph integrating the first sub-field and the second sub-field based on the first knowledge, the second knowledge and the third knowledge comprises:
    building the knowledge graph based on the first knowledge, the second knowledge, the third knowledge, the fourth knowledge and the fifth knowledge.

6. The method according to claim 5, wherein building the knowledge graph integrating the first sub-field and the second sub-field comprises:
    building a knowledge graph of the first sub-field based on the first knowledge, the fourth knowledge, and the fifth knowledge;
    building a knowledge graph of the second sub-field based on the second knowledge and the third knowledge; and
    combining the knowledge graph of the first sub-field and the knowledge graph of the second sub-field into a knowledge graph of the first sub-field and the second sub-field;
    wherein comparing attributes of an entity in the knowledge graph of the first sub-field with respective attributes of an entity in the knowledge of graph the second sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

7. An apparatus for creating a knowledge graph in the industrial field, the apparatus comprising:
    a first obtaining module to obtain first unstructured data from a first data source in a first sub-field of the industrial field, wherein the first unstructured data carries knowledge annotations;
    a performing module to perform machine learning on the first unstructured data to generate a first model adapted to extract knowledge;
    a first extracting module to extract first knowledge from second unstructured data provided by the first data source based on the first model, wherein the second unstructured data does not carry knowledge annotations;
    a second obtaining module to obtain first structured data and first semi-structured data from a second data source in a second sub-field of the industrial field;

a second extracting module to extract second knowledge from the first structured data;

a third extracting module to extract third knowledge from the first semi-structured data; and a building module to build a knowledge graph integrating the first sub-field and the second sub-field based on the first knowledge, the second knowledge and the third knowledge, wherein the first knowledge, the second knowledge and the third knowledge are all represented in the form of triples.

8. The apparatus according to claim 7, wherein the proportion of unstructured data in the first sub-field is greater than a predetermined threshold, and the proportion of unstructured data in the second sub-field is less than the threshold.

9. The apparatus according to claim 8, wherein the first sub-field and the second sub-field belong to a single industrial category.

10. The apparatus according to claim 9, wherein the first sub-field and the second sub-field belong to a single industrial sub-category.

11. The apparatus according to claim 7, wherein:

the first obtaining module is configured to obtain second structured data and second semi-structured data from the first data source;

the first extracting module is configured to extract fourth knowledge from the second structured data and the fifth knowledge from the second semi-structured data; and the building module is configured to build the knowledge graph based on the first knowledge, the second knowledge, the third knowledge, the fourth knowledge and the fifth knowledge.

12. The apparatus according to claim 11, wherein the building module is configured to build a knowledge graph of the first sub-field based on the first knowledge, the fourth knowledge and the fifth knowledge; build a knowledge graph of the second sub-field based on the second knowledge and the third knowledge; combine the knowledge graph of the first sub-field and the knowledge graph of the second sub-field into a knowledge graph of the first sub-field and the second sub-field; wherein comparing attributes of an entity in the knowledge graph of the first sub-field with respective attributes of an entity in the knowledge graph of the second sub-field, determining similarity between the entity in the knowledge graph of the first sub-field and the entity in the knowledge graph of the second sub-field; combining the entity in the knowledge graph of the first sub-field and the entity in the knowledge graph of the second sub-field when the similarity is higher than a preset threshold.

* * * * *